(12) United States Patent
Li et al.

(10) Patent No.: US 7,593,333 B2
(45) Date of Patent: Sep. 22, 2009

(54) EFFICIENT ONE-TO-MANY CONTENT DISTRIBUTION IN A PEER-TO-PEER COMPUTER NETWORK

(75) Inventors: Jin Li, Sammamish, WA (US); Philip A. Chou, Bellevue, WA (US); Cha Zhang, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 10/887,406

(22) Filed: Jul. 7, 2004

(65) Prior Publication Data

US 2006/0007947 A1    Jan. 12, 2006

(51) Int. Cl.
*G01R 31/08* (2006.01)

(52) U.S. Cl. .................. 370/232; 370/390; 370/432; 370/468

(58) Field of Classification Search .......... 370/432, 370/232, 390, 468
See application file for complete search history.

(56) References Cited

U.S. PATENT DOCUMENTS

| | | | | |
|---|---|---|---|---|
| 2002/0085493 A1* | 7/2002 | Pekkala et al. | ...... | 370/235 |
| 2002/0108121 A1* | 8/2002 | Alao et al. | ...... | 725/110 |
| 2003/0028636 A1* | 2/2003 | Cherkasova et al. | ...... | 709/225 |
| 2003/0031176 A1* | 2/2003 | Sim | ...... | 370/392 |
| 2005/0086469 A1* | 4/2005 | Dunagan et al. | ...... | 713/163 |

OTHER PUBLICATIONS

Blomer, J., Kalfane, M., Karp, R., Karpinski, M., Luby, M., and Zuckerman, D., "An Xor-based erasure-resillient coding scheme," Technical report, International Computer Science Institute, Berkeley, California, 1995.
Castro, M., Druschel, P., Kermarrec, A-M., Nandi, A., Rowstron, A. and Singh, A., "SpiltStream: High-bandwidth content distribution in a cooperative environment", IPTPS'03, Berkeley, CA, Feb. 2003.
Chawathe, Y., "Scattercast: an architecture for internet broadcast distribution as an infrastructure service". *PhD thesis*, University of California, Berkeley, Aug. 2000.

(Continued)

*Primary Examiner*—Seema S Rao
*Assistant Examiner*—Sai-Ming Chan
(74) *Attorney, Agent, or Firm*—Lyon & Harr, L.L.P.; Craig S. Fischer

(57) ABSTRACT

A content distribution method and system for distributing content over a peer-to-peer network such that the full potential throughput of the network is achieved. The content distribution method divides the content to be distributed into many small blocks. Each of the content blocks then is assigned to a node, which can be a content-requesting node, a non-content-requesting node or a source node. Content is assigned based on a capacity of the node, where nodes having a larger capacity are assigned a greater number of content blocks and nodes having a smaller capacity are assigned a fewer content blocks. The capacity generally is defined as the upload bandwidth of the node. Redistribution queues are employed to control the throughput of the distribution. This bandwidth control strategy ensures that upload bandwidths of the peer and source nodes are fully utilized even with network anomalies such as packet losses and delivery jitters.

40 Claims, 9 Drawing Sheets

OTHER PUBLICATIONS

Cherkasova, L. and Lee, J., "FastRepublica: Efficient Large File Distribution within Content Delivery Networks", *Proceedings of the 4-th USENIX Symposium on Internet Technologies and Systems*, Seattle, Washington, Mar. 26-28, 2003.

Cohen, B., "Incentives build robustness in BitTorrent", http://bitconjurer.org/BitTorrent/bittorrentecon.pdf.

Hua Chu, Y., Rao, S., Zhang, H., "A case for end system multicast", In *Proceedings of Sigmetrics 2000* (Santa Clara, CA, Jun. 2000), in Proceedings of the Eleventh International Workshop on Network and OS Support for Digital Audio.

Jannotti, J., Gifford, D. K., Johnson, K. L., Kaashoek, M. F. and O'Toole Jr., J. W., "Overcast: reliable multicasting with and overlay network". In *Proceedings of the Fourth Symposium on Operating System Design and Implementation (OSDI)*, Oct. 2000.

Kostic, D., Rodriguez, A., Albrecht, J., and Vahdat, A., "Bullet: High Bandwidth Data Dissemination Using an Overlay Mesh", in *Proceedings 19th ACM Symposium on Operating Systems Principles*, Oct. 19-22, 2003, the Sagamore, New York.

Padmanabhan, V. N. and Sripanidkulchai, K., "The Case for Cooperative Networking", in *Proceedings of the First International Workshop on Peer-to-Peer Systems (IPTPS)*, Cambridge, MA, USA, Mar. 2002.

Rowstron, A. and Druschel, P., "Pastry: scalable, distributed object location and routing for large-scale peer-to-peer systems", *IFIP/ACM International Conference on Distributed Systems Platforms (Middleware)*, Heidelberg, Germany, pp. 329-350, Nov. 2001.

Padmanabhan, V., H. Wang, and P. Chou, Distributing streaming media content using cooperative networking, *Proc. Network and Operating Sys. Support for Digital Audio and Video (NOSSDAV)*, Miami, FL, May 2002, pp. 177-186.

* cited by examiner

EFFICIENT ONE-TO-MANY CONTENT DISTRIBUTION IN A PEER-TO-PEER COMPUTER NETWORK

TECHNICAL FIELD

The present invention relates in general to computer networking and more particularly to an efficient method and system for distributing content over a peer-to-peer network such that delivery throughput is maximized.

BACKGROUND OF THE INVENTION

Many applications require a one-to-many content distribution, where one computer in a computer network sends content to several other computers on the network. An example of such applications includes software distribution, Internet TV/video streaming, video conferencing, personal media distribution, and peer-to-peer (P2P) web content duplication. A P2P network is a type of network in which each computer has equivalent capabilities and responsibilities.

FIG. 1 is a block diagram illustrating the one-to-many content distribution problem. The network 100 includes a source node s, which holds the content to be distributed, and multiple peer nodes $t_i$, i=1, 2, . . . , N, each of which may or may not request a copy of the content. Both the source node and the peer nodes are end-user nodes. They are usually computers connected to the Internet through an internet service provider (ISP), using an asymmetric digital subscriber line (ADSL), cable modem, campus, or corporate network link. The simplest approach for a source node to distribute content in the setting shown in FIG. 1 is to allow the source node send the content directly to the destination nodes. Though straightforward, the throughput of the content distribution is bounded by the upload bandwidth of the source node, which is usually fairly limited.

One network-level solution to address such a content distribution problem as shown in FIG. 1 is Internet Protocol (IP) multicast. In IP multicast, a single packet that is transmitted from a source is duplicated at routers along a distribution tree rooted at the source. In this manner, content is delivered to an arbitrary number of receivers. Although IP multicast is an efficient solution, its deployment has been slow in the real world because of issues and problems such as inter-domain routing protocols, Internet Service Provider (ISP) business models, congestion control along the distribution tree, and so forth. Because of these problems in deploying a network-level multicast service, the vast majority of traffic in the Internet today is unicast based, whereby two computers directly talk to each other.

Since a network-level solution is not generally feasible for the reasons given, a variety of different approaches have been developed to enable P2P computers, instead of routers, distribute the content from the source. In general, the most promising approach is application-level multicast (ALM). In ALM, a multicast distribution tree is formed and overlaid on an existing network. Instead of using the multicast protocol, each peer computer in the distribution tree uses a unicast protocol to implement all multicast related functionalities including packet replication, membership management and content delivery on the overlaid network.

Some examples of ALM systems include Scattercast, which is described in a paper by Y. Chawathe entitled "Scattercast: an architecture for internet broadcast distribution as an infrastructure service", a PhD thesis for the University of California, Berkeley, August 2000, and Overcast, which is described in a paper by J. Jannotti, D. K. Gifford, K. L. Johnson, M. F. Kaashoek, and J. W. O'Toole Jr. entitled "Overcast: reliable multicasting with an overlay network" in *Proc. of the Fourth Symposium on Operating System Design and Implementation (OSDI)*, October 2000. Both Scattercast and Overcast use a single tree to distribute content.

FIG. 2 is a block diagram illustrating the content distribution techniques using a single distribution tree 200, as is used in Scattercast and Overcast. In this configuration, a source node, s, sends data to node $t_1$, which forwards the data to nodes $t_2$ and $t_3$. The ALM distribution tree 200 utilizes the upload bandwidth of the intermediate node $t_1$, whereas the upload bandwidths of the leaf nodes $t_2$ and $t_3$ are not utilized. Compared with letting the source node directly send its content to all other clients, the distribution tree approach shown in FIG. 2 reduces the network load of the source, and thus achieves a more efficient content distribution.

One problem, however, with Scattercast and Overcast is that they are inefficient at distributing content. Specifically, in a distribution tree, the intermediate nodes redistribute the content, while the leaf nodes only receive the content. This means that the upload bandwidths of the leaf nodes are not utilized for content distribution.

Several attempts have been made to overcome such inefficiency. These techniques include a technique called CoopNet, which is described in papers by V. N. Padmanabhan and K. Sripanidkulchai entitled "The Case for Cooperative Networking", in *Proc. of the First International Workshop on Peer-to-Peer Systems (IPTPS)*, Cambridge, Mass., USA, March 2002, and by V. N. Padmanabhan, H. J. Wang, and P. A. Chou, "Resilient Peer-to-Peer Streaming," in *Proc. IEEE International Conference on Network Protocols (ICNP)*, Atlanta, Ga., USA, November 2003; and a technique called SplitStream, which is described in a paper by M. Castro, P. Druschel, A-M. Kermarrec, A. Nandi, A. Rowstron and A. Singh entitled "SplitStream: High-bandwidth content distribution in a cooperative environment", in *Proc. of the International Workshop on Peer-to-Peer-to-Systems*, Berkeley, Calif., February, 2003. Each of these techniques split the content into multiple stripes and distributed the stripes across separate multicast trees with disjoint interior nodes. Any peer computer can be an interior node in one of the multicast trees, and can contribute to forwarding the content.

CoopNet uses a centralized tree management scheme, while SplitStream relies on Pastry to maintain the distribution tree. Pastry is described in a paper by A. Rowstron and P. Druschel entitled "Pastry: scalable, distributed object location and routing for large-scale peer-to-peer systems" *in Proc. of IFIP/ACM International Conference on Distributed Systems Platforms (Middleware)*, Heidelberg, Germany, pages 329-350, November, 2001. CoopNet further utilizes multiple description coding (MDC) and forward error correction (FEC) to protect from packet loss and node failure.

FIG. 3 is a block diagram illustrating a two application-level multicast tree configuration 300, as is used on CoopNet and SplitStream. The content is divided into two equal stripes. A first stripe 310 is sent to node $t_1$, which forwards the stripe to nodes $t_2$ and $t_3$. A second stripe 320 is sent to node $t_2$, which forwards the strip to nodes $t_1$ and $t_3$. It should be noted that in FIG. 3 the distribution route of the first stripe is marked with a solid line, and the distribution route of the second stripe with a dashed line. This means that the contents delivered on these links is different. One problem with this configuration is that the system 300 utilizes the upload bandwidths of nodes $t_1$ and $t_2$, but fails to utilize the upload bandwidth of node $t_3$, thus reducing efficiency.

Other techniques that attempted to overcome such inefficiency include a technique called FastReplica, discussed in paper by L. Cherkasova and J. Lee entitled "FastReplica: Efficient Large File Distribution within Content Delivery Networks" in *Proc. of the 4-th USENIX Symposium on Internet Technologies and Systems*, Seattle, Wash., Mar. 26-28, 2003, and a technique called Bullet, discussed in a paper by D. Kostic, A. Rodriguez, J. Albrecht, A. Vahdat entitled "Bullet: High Bandwidth Data Dissemination Using an Overlay Mesh" in *Proc. 19th ACM Symposium on Operating Systems Principles*, Oct. 19-22, 2003, the Sagamore, N.Y. Both of these techniques investigated the issue of efficient and reliable replication of large files. If there were n nodes, FastReplica first partitioned the file into n subfiles of equal size. Each subfile was then transferred to a different peer in the group, which was subsequently replicated and transferred to the other peers. In Bullet, peer nodes were organized into an overlay tree. Each node split the content received from the parent into a disjoint set of blocks, with each set sent to a different child node. The child nodes then discovered the missing blocks and the nodes that held the missing blocks, and sent requests to recover the missing blocks.

Looking closer at the FastReplica technique, it should be noted that this technique is specifically designed for file download. For an N node P2P network, FastReplica distributes the file with N height-2 multicast trees with intermediate degree N-1. FIG. 4 is a block diagram illustrating a sample FastReplica configuration 400 of three peer nodes. FastReplica distributes the file in two steps: the distribution step and the collection step. In the distribution step, the file is split into three subfiles and sent to nodes $t_1$, $t_2$ and $t_3$ (along solid, dashed, and dotted lines), respectively. In particular, the three subfiles are sent along first stripe 410, a second stripe 420, and a third stripe 430. After the distribution step, the collection step is implemented. Each peer node forwards its subfile to the other peer nodes. As shown in FIG. 4, each of the peer nodes is engaged in the content distribution in FastReplica.

A practical P2P content distribution system has been implemented using a technique called BitTorrent. BitTorrent is described in a paper by B. Cohen that is entitled "Incentives build robustness in BitTorrent" and is available at the web site http://bitconjurer.org/BitTorrent/bittorrentecon.pdf. BitTorrent includes sharing incentive so that peers are willing to distribute content because the more content they upload, the more they will be able to download from the peers. These are just a few examples of the many recent schemes for application-level multicast.

Although the above ALM distribution strategies are more efficient than directly sending content from the source to the peers, they fail to achieve the most efficient content distribution in the network. Specifically, none of the above techniques has adequately considered the differences in bandwidth between the peer nodes. Each technique also fails to fully engage the bandwidth resources of all the peer nodes to distribute the content.

All of the above one-to-many content distribution approaches discussed above adapt to the capabilities of the peer nodes (the upload/download bandwidths of the peer nodes) by establishing a suitable network topology. Nodes with high bandwidth are placed in the center of the distribution network, and are in charge of more content distribution. Once the network topology is established, the content is distributed in fixed stripes through the established network. The problem with these distribution strategies is that the distribution network is less flexible to adapt to changes in the network conditions (such as any congestion of certain nodes/links). This can severely reduce efficiency of the content distribution. Therefore, what is needed is a one-to-many content distribution technique that distributes content in a most efficient manner possible in order to realize the maximum potential from the computer network.

SUMMARY OF THE INVENTION

The invention disclosed herein includes a content distribution method and system for efficiently distributing content over a peer-to-peer network such that delivery throughput is maximized. The content distribution method and system overcomes the above-mentioned deficiencies of current one-to-many distribution techniques. In contrast to existing approaches, the content distribution method and system achieves the maximum possible throughput for its content by engaging as many nodes as possible to distribute the content and fully utilizing each node's available upload bandwidth. Furthermore, the content distribution method and system can adjust the content sending rate dynamically to match the maximum throughput under the prevailing network conditions.

The content distribution method and system includes at least three distinct features. First, the content distribution method and system splits the content to be distributed, be it a file or a media stream, into many small blocks. The number of blocks redistributed by a certain node can thus be proportional to the resource (such as an upload bandwidth) of the node. The node with larger upload bandwidth may redistribute more blocks, and the node with smaller upload bandwidth may redistribute fewer blocks. Second, in the content distribution method and system, each content block is assigned to a single node for redelivery. The node in charge of the redelivery can be a content-requesting peer node, a non-content-requesting peer node, or even the source node itself. Third, by employing redistribution queues between the nodes, the content distribution method and system can effectively deal with dynamic changes in the network condition. This allows the content distribution method and system to effectively cope with variations in the upload bandwidth, packet loss and packet jitter of each node in the network on an ongoing basis.

The content distribution method includes dividing the content into a plurality of blocks, and assigning each of the plurality of blocks to a node proportional to a capacity of the node such that a node having a larger capacity is assigned more blocks and a node having a smaller capacity is assigned fewer blocks. The capacity of the node can be defined in terms of a bandwidth of the node, or an upload bandwidth of the node. Alternatively, the capacity of the node can be defined using other measures, e.g., the margin delay, the capacity minus the packet lost, etc. The network can be a peer-to-peer computer network.

The size of the content blocks can be less than a maximum transmission unit (MTU) of the computer network, which in some cases is approximately 1 kilobyte (KB). The content block size is a compromise between a granularity of distribution and an overhead required for identifying the blocks.

The method uses a bandwidth control strategy to enable dynamic redistribution of blocks based on changes in the capacity of the node. The bandwidth control strategy employs redistribution queues between each of the nodes in the network. The queues can be transport control protocol (TCP) send and receive buffers or can be application buffers implemented on top of the user datagram protocol (UDP). Unlike TCP, UDP does not have buffers. This means that when UDP is used the user needs to implement additional buffers that serve as the redistribution queue. The method further includes connection between nodes such that a forward link is defined as a connection having content blocks to be further redistributed. Likewise, a delivery link is defined as a connection having content blocks not to be further redistributed.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Although current one-to-many distribution techniques in peer-to-peer (P2P) computer networks are more efficient than directly sending content from source node to the peer nodes, these techniques fail to achieve the most efficient content distribution in the network. This is due to a number of factors. One factor is that none of these current techniques adequately accounts for and adapts to differences in bandwidth between the peer nodes. Another factor is that these techniques fail to fully utilize the bandwidth capabilities of all of the peer nodes on the network when distributing the content.

The content distribution method and system disclosed herein is a new type of delivery mechanism for one-to-many content distribution, especially in peer-to-peer (P2P) networks. Compared with prior one-to-many content distribution approaches, the content distribution method and system disclosed herein splits the content to be distributed into many small blocks. This allows nodes having a greater capacity (such as upload bandwidth) to redistribute more blocks, and nodes with less capacity to redistribute fewer blocks. Each content block is assigned to a single node for distribution, and the node in charge can be a content-requesting peer node, a non-content-requesting peer node, or even the source node.

The throughput of the distribution is controlled by redistribution queues between the source and the peer nodes. The content distribution method and system fully utilizes the upload bandwidths of all the peer nodes, thereby maximizing the delivery throughput. Furthermore, the content distribution method and system is simple and flexible. It can be applied to file/software downloading, media streaming, and erasure coded file distribution in a P2P network.

II. General Overview

Figure 1:
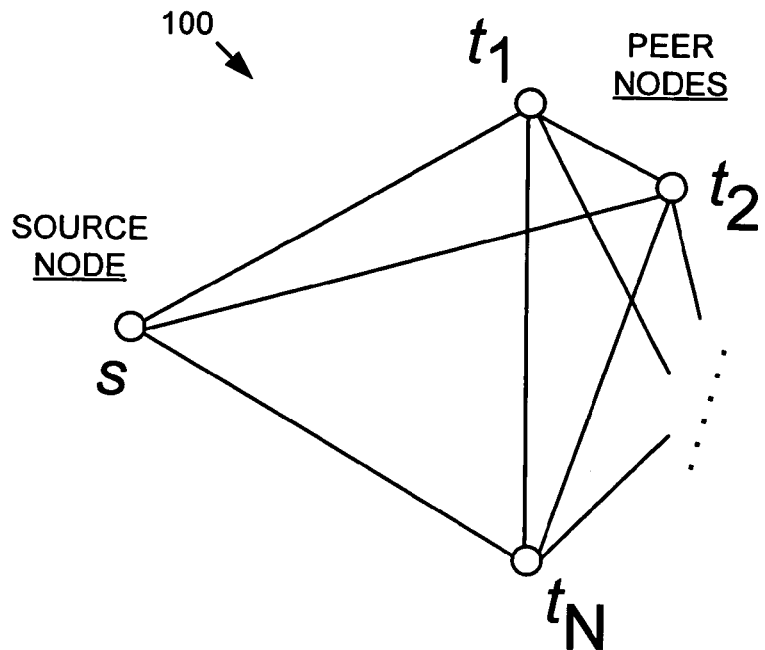
FIG. 1 is a block diagram illustrating the one-to-many content distribution problem.
Figure 2:
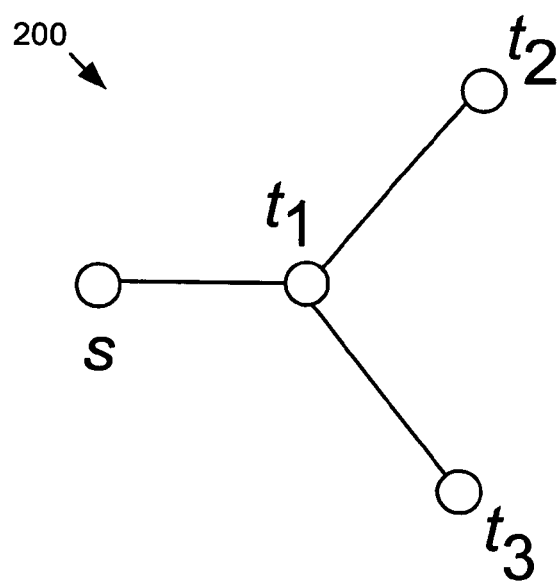
FIG. 2 is a block diagram illustrating content distribution techniques using a single distribution tree.
Figure 3:
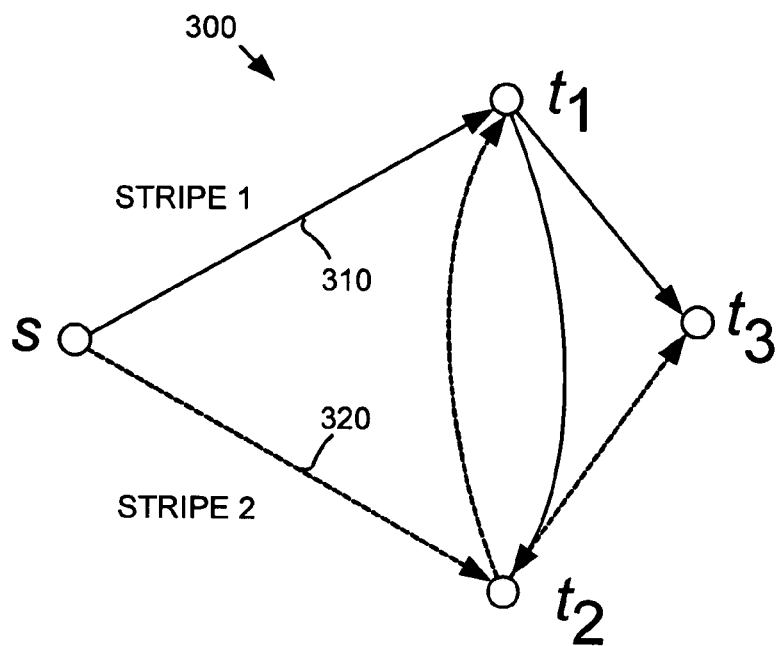
FIG. 3 is a block diagram illustrating a two application-level multicast tree configuration.
Figure 4:
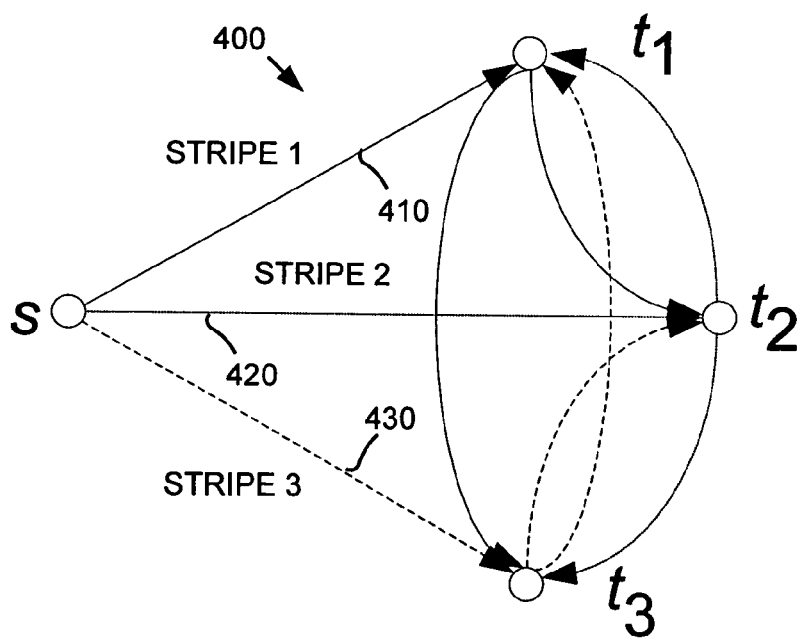
FIG. 4 is a block diagram illustrating a sample configuration of three peer nodes.
Figure 5:
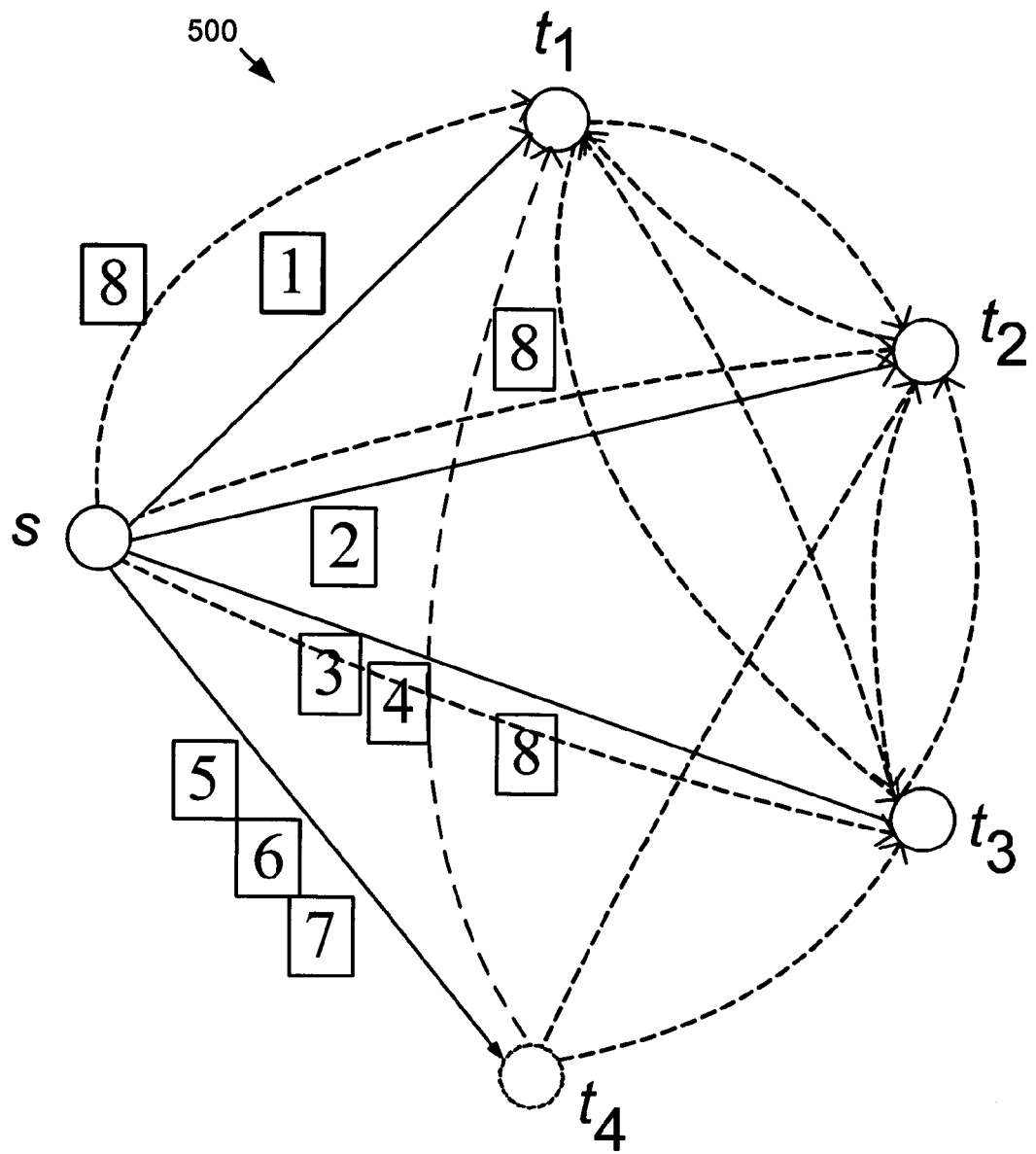
FIG. 5 is a block diagrams illustrating an exemplary implementation of the content distribution system and method disclosed herein.

FIG. 5 is a block diagrams illustrating an exemplary implementation of the content distribution system and method disclosed herein. It should be noted that FIG. 5 is merely one of several ways in which the content distribution system and method may implemented and used.

Referring to FIG. 5, in this exemplary implementation a peer-to-peer (P2P) network 500 is shown. The network 500 includes one source node s and four peer nodes $t_1$, $t_2$, $t_3$ and $t_4$. Among the peer nodes, the nodes $t_1$, $t_2$ and $t_3$ request a copy of the content from the source node s, and are called content-requesting peer nodes. Node $t_4$ does not request a copy of the content, and is called a non-content requesting peer node. It should be noted that, according to the content distribution system and method disclosed herein, even though peer node $t_4$ does not request content, it still contributes its upload bandwidth to help distributing the content to the other peer nodes.

Content to be distributed is contained at the source node s and divided or separated into many small blocks. The content may include a file or a media stream. Each block then is assigned to one of the nodes for redelivery. Each block is only assigned to a single node. When a block is assigned to content-receiving peer nodes $t_1$, $t_2$ and $t_3$ for redistribution, such as the blocks 1, 2, 3 and 4 shown in FIG. 5, the block is first sent by the source node s to the assigned peer node (or the peer node in charge of redelivery). The assigned peer node then forwards the block to the other two peer nodes. By way of example, if block 1 shown in FIG. 5 is assigned to peer node $t_1$, then block 1 is sent by the source node s to the peer node $t_1$ and the peer node $t_1$ then forwards block 1 to peer nodes $t_2$ and $t_3$.

When a block is assigned to a non-content-receiving peer node $t_4$ for redistribution, such as blocks 5, 6 and 7 shown in FIG. 5, the block is first sent by the source node s to the peer node $t_4$. The non-content-receiving peer node $t_4$ then forwards the block to the other three peer nodes $t_1$, $t_2$ and $t_3$ on the network 500. For example, if block 5 shown in FIG. 5 is assigned to the non-content-receiving peer node $t_4$, then block 5 is sent by the source node s to the peer node $t_4$ and the peer node $t_4$ forwards block 5 to peer nodes $t_1$, $t_2$ and $t_3$.

The source node s may also choose to directly distribute a block. By way of example, as shown in FIG. 5, block 8 is distributed by the source node s to the content-requesting peer nodes $t_1$, $t_2$ and $t_3$. In this situation, block 8 is sent directly source node s to the content-requesting peer nodes $t_1$, $t_2$ and $t_3$.

The content distribution system and method disclosed herein establishes redistribution queues between each pair of the nodes in the network 500. As explained in detail below, these redistribution queues allow the content distribution system and method to cope with dynamic changes in the condition of the network 500, such as changes in bandwidth, packet loss and packet jitter. The redistribution queues are shown in FIG. 5 as solid lines and dashed lines. The solid lines between nodes indicate forward links, while the dashed lines between nodes indicates delivery links. The forward link is a connection carrying blocks to be redistributed. The delivery link is a connection that carries blocks that are not to be further redistributed.

III. Operational Overview

Figure 6:
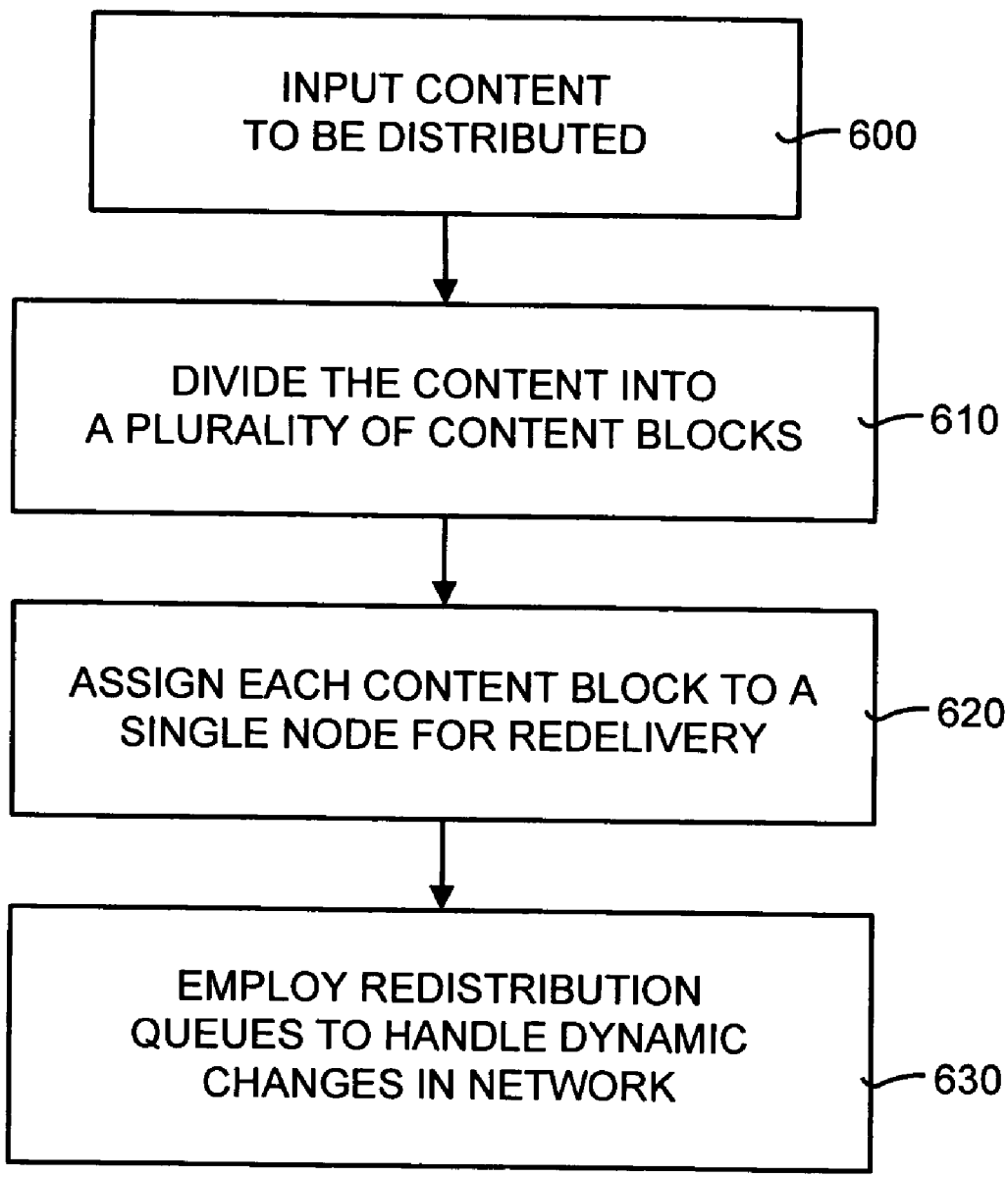
FIG. 6 is a general flow diagram illustrating the general operation of the content distribution system and method shown in FIG. 5.

The operation of the content distribution system and method shown in FIG. 5 now will be discussed. FIG. 6 is a general flow diagram illustrating the general operation of the content distribution system and method shown in FIG. 5. The content distribution method begins by inputting content to be distributed (box 600). As noted above, this content may includes a file or a media stream. Next, the content is divided or separated into a plurality of smaller blocks (box 610). Dividing the content into smaller blocks allows different nodes to redistribute a different number of blocks. Thus, the number of blocks redistributed by a certain node can be proportional to the capacity (such as the upload bandwidth) of the node. For example, a node having larger upload bandwidth may redistribute a greater number of blocks, while a node having a smaller upload bandwidth may redistribute fewer blocks.

Each block of content then is assigned to a single node for redelivery (box 620). As described above, the node in charge of the redelivery can be a content-requesting peer node, a non-content-requesting peer node, or even the source node itself. Redistribution queues between the nodes then are employed to handle dynamic changes in the network (box 630). By employing these redistribution queues between the nodes, the content distribution method can deal effectively with dynamic changes in the network condition. By way of example, changes in the network condition such as variations in the upload bandwidth, packet loss and packet jitter of each node in the network are handled on an ongoing basis so that if a node experiences a decrease in capacity the number of content blocks assigned to that node for redelivery is decreased proportionately.

IV. Operational Details And Working Example

The details of the operation of the content distribution method shown in FIG. 6 now will be discussed. The basic distribution framework of the content distribution method is as follows. The content being distributed is divided into blocks $B_j$, j=1, 2, . . . , M. For each block $B_j$, one unique node is assigned to distribute the content block to the rest of the peer nodes. This unique node is the node in charge of redistribution for that block. Frequently, the node in charge of redistributing the block $B_j$ is a peer node $t_i$. In such a case, the source node sends one copy of the block $B_j$ to the peer node $t_i$, which then redistributes the block $B_j$ by sending a copy of the block to the rest of the peer nodes. However, when the source node has abundant bandwidth resources, the node in charge of distributing the block $B_j$ can be the source node s itself. In that case, the source node will directly send one copy of block $B_j$ to each peer node $t_i$.

Content Division

As noted above with regard to FIG. 6, the content distribution method initially divides the content to be distributed into many small blocks. The number of blocks redistributed by a node can then be proportional to the capacity (or resource) of the node. In a preferred implementation, the capacity is evaluated or defined in terms of the upload bandwidth of the node.

A node having a larger upload bandwidth may be given a greater number of content blocks for redistribution. Similarly, a node having a smaller upload bandwidth may be given a fewer number of content blocks for redistribution.

The content distribution method divides the content into a large number of smaller blocks for distribution. The size of a content block is a compromise between the granularity of distribution and the overhead required for identifying the block. In a tested implementation, a preferred size of the content block is slightly less than a maximum transmission unit (MTU) of the network. This allows a content block to be sent as a single packet over the network. In the tested implementation, the content block size was set at 1 kilobyte (KB).

Distribution Routes

During content distribution each content block is assigned to a certain node for redistribution. The number of content blocks assigned to a peer node is proportional to its capacity, which in a tested implementation, is evaluated by its upload bandwidth. The upload bandwidth is used because in terms of the contribution of a peer node to the network, it is the upload bandwidth of the peer node that matters. Thus, to efficiently distribute content in a P2P network, the content distribution method should make use of the upload bandwidths of the peer nodes as much as possible.

In addition, it should be noted that for content block distribution, the primary parameter that governs the speed of the distribution is the throughput of the network link. If a client can choose multiple servers from which to receive a file, it should choose the server that provides the fastest network throughput between the two. Other network parameters, such as round trip time (RTT), packet loss ratio, network jitter, are less relevant than the throughput of the network link. In networks composed of the end-user nodes, the network may be characterized by assigning an upload bandwidth constraint on each node, a download bandwidth constraint on each node, and a link bandwidth constraint between any two nodes or any two groups of nodes. However, the bottleneck is usually the upload bandwidths of the nodes.

In the content distribution method described herein, a peer node sends content to multiple destinations. The output of the peer node thus splits among multiple receivers. As a result, the link bandwidth required between the two peer nodes is only a fraction of the upload bandwidth of the sending node, which usually does not become the bottleneck. The required download bandwidth for a node to receive the content is always less than the total available upload bandwidths of all the nodes in the network divided by the total number of receiving nodes. In increasingly common networks, the total upload bandwidths of the end-user nodes are much smaller than the total download bandwidths. This is especially true for end-user nodes on the cable modem and ADSL networks, for which the balance is asymmetrically skewed towards larger download bandwidth. Even for user nodes on the campus networks or the corporate networks, the download bandwidth can still be much larger than the available upload bandwidth because the user may cap the upload bandwidth to limit participation in P2P network activities. In the following discussion, it will be assumed that the receiving nodes have enough download and link bandwidths to receive content from the content distribution method.

Referring again to FIG. 5, assume that the upload bandwidths of the peer nodes $t_1$ and $t_2$ are B; that of the peer node $t_3$ is 2B; that of the peer node $t_4$ is 3B; and that of the source node is 4B, where B is a unit of bandwidth. An optimal strategy of fully utilizing the upload bandwidths of the source and peer nodes is shown in Table 1.

TABLE 1

| Receiving node | Sending node, and Link BWs | | | | | Download BW |
|---|---|---|---|---|---|---|
| | s | $t_1$ | $t_2$ | $t_3$ | $t_4$ | |
| $t_1$ | 0.83B | — | 0.5B | B | B | 3.33B |
| $t_2$ | 0.83B | 0.5B | — | B | B | 3.33B |
| $t_3$ | 1.33B | 0.5B | 0.5B | — | B | 3.33B |
| $t_4$ | B | — | — | — | — | B |
| Upload BW | 4B | B | B | 2B | 3B | |

If the network includes a source node, $N_1$ content-requesting peer nodes ($N_1 > 1$ as otherwise the problem is trivial) and $N_2$ non-content-requesting (but willing to participate) peer nodes, the network using the content distribution method will distribute the content through $N_1$ height-2 trees with intermediate degree $N_1-1$ (with the intermediate node being one of the content-requesting nodes), $N_2$ height-2 trees with intermediate degree $N_1$ (with the intermediate node being one of the non-content-requesting nodes), and one height-1 tree with degree $N_1$, all rooted at the source node.

It should be noted that this network topology employed by the content distribution method and system has a number of features that make it distinct from the FastReplica technique described above. First, the content distribution method and system does not separate the distribution and the collection steps. Instead, the content blocks are distributed continuously by the source and the peer nodes. Second, in the content distribution method, the amount of content being redistributed by a particular peer is not fixed, but varies according to the capabilities (such as the upload bandwidths) of the peer nodes. Finally, the content distribution method and system may involve the source node and non-content-requesting peer nodes in the redistribution of content.

The content distribution method distributes content through three routes: 1) through content-requesting peer nodes, 2) through non-content-requesting peer nodes, and 3) directly from the source node. Each distribution method demands different amounts of network resource from the participating nodes. Again, the network resource of chief concern is the upload bandwidth consumed. To distribute a portion of content having bandwidth B in a network of $N_1$ content-requesting peer nodes using the content distribution method, the first distribution route demands upload bandwidth B from the source node, and upload bandwidth $(N_1-1)B$ from each content-requesting peer node. The second distribution route demands upload bandwidth B from the source node, and upload bandwidth $N_1 \cdot B$ from each non-content-requesting peer node. The third distribution route demands upload bandwidth $N_1 \cdot B$ from the source node. Thus, the content distribution method uses the upload bandwidths of the peer nodes (including the content-requesting peer nodes and the non-content-requesting peer nodes) to alleviate the upload bandwidth burden on the source node. This has the effect of speeding up the maximum rate of content distribution.

It should be noted that for the same route, the amount of network resource consumed is independent of the individual upload bandwidth of each peer node. Thus the bandwidth allocation problem may be considered with respect to each route category instead of each peer node.

Bandwidth Allocation

In a network using the content distribution method and system, the most precious resource is the upload bandwidth of the source node, where the content originates. If the upload bandwidth of the source node is used up, content distribution cannot be further sped up, even if there are still peer nodes with available upload bandwidths. It is apparent that if the source node sends content blocks at rate B through the delivery links to all $N_1$ content-requesting peer nodes, it will consume $N_1 \cdot B$ of the upload bandwidth of the source. On the other hand, if the source node sends content blocks at rate B to a peer node $t_i$, which in turn distributes the blocks to the rest of the content-requesting peer nodes, only an amount B of the upload bandwidth of the source node is needed. Apparently, as long as there are more than one content-requesting peer nodes, the source node should forward as many content blocks as possible to the peer nodes for redelivery. Between the content-requesting and non-content-requesting peer nodes, the content-requesting peer nodes have a slight edge in efficiency, as the content blocks sent to the nodes in the forward links are not wasted. As a result, among the three distribution routes outlined above, a most preferred route is route 1 (through content-requesting peer nodes), followed by route 2 (through non-content-requesting peer nodes). Only when the source node still has upload bandwidth left, it may choose route 3 to distribute content directly to the peer nodes.

Assume that the network using the content distribution method and system includes a source node of upload bandwidth $B_s$, $N_1$ ($N_1 > 1$), content-requesting peer nodes with average bandwidth $B_1$, and $N_2$ non-content-requesting peer nodes with average bandwidth $B_2$. Applying the distribution route selection strategy discussed above, the distribution throughput of the content distribution method and system, which is defined as the amount of content multicast to the content-requesting peer nodes per second is:

$$\theta = \begin{cases} B_s & B_s \leq B_{s1} + B_{s2}, \\ (B_{s1} + B_{s2}) + \dfrac{B_s - (B_{s1} + B_{s2})}{N_1} & B_s \geq B_{s1} + B_{s2}, \end{cases} \quad (1)$$

with $$B_{s1} = \frac{N_1}{N_1 - 1} B_1 \quad \text{and} \quad B_{s2} = \frac{N_2}{N_1} B_2.$$

Equation (1) shows that before the upload bandwidths of all the peer nodes have been exhausted, the distribution throughput is limited only by the upload bandwidth of the source node. All $N_1$ content-requesting peer nodes receive content at the rate of the upload bandwidth of the source node. After the upload bandwidths of all the peer nodes have been exhausted, the distribution throughput becomes $(1/N_1)^{th}$ of the sum of the upload bandwidths of the network $(N_1 B_1 + N_2 B_2 + B_s)$ minus a small portion $(N_2 B_2 1 N_1)$ wasted in the distribution through non-content-requesting peer nodes.

Distribution Route Selection Through Redistribution Queues

With the distribution route priority implemented as outlined above, it is assumed that the available upload bandwidths of the source and all the peer nodes are known, such that the bandwidth allocated between any two peer nodes may be calculated explicitly. This provides direction so that the content blocks may be distributed accordingly. However, there is an even simpler method that works in a distributed fashion. A queue may be used to estimate the bandwidth on any connection link, and govern the selection of the distribution routes of the content blocks based on the status of the queues. This achieves implicit bandwidth allocation when the bandwidths of the network are unknown.

The bandwidth control strategy of the content distribution method includes establishing a queue to buffer content being delivered from one node to another. The queue is used to control the speed of distribution between any two nodes. In a tested implementation of content distribution method, the links between nodes are established via TCP connections. The redistribution queues thus are TCP send and receive buffers. An additional advantage of using TCP is that the flow control, reliable data delivery and node leave event all are handled automatically by TCP.

The TCP connection carrying blocks to be redistributed is called a forward link, while the TCP connection that carries blocks not to be further redistributed is called the delivery link. One TCP connection (the delivery link) is established from each peer node to every other content-requesting peer node. Moreover, one TCP connection (the forward link) is established from the source node to every non-content-requesting peer node, and two TCP connections (the forward and the delivery links) are established from the source node to every content-requesting peer nodes. The selection of the distribution routes then becomes finding available slots in the TCP connections.

The process of redelivery will now be discussed in detail, in terms of the source and peer nodes. Each content-requesting peer node includes at least two threads. One thread (the "delivery link" thread) receives the content blocks from the delivery link, while a second thread (the "forward link" thread) receives the content blocks from the forward link and redistributes them to the rest of the content-requesting peer nodes through their delivery links. For non-content-requesting peer nodes, only the forward link thread is operated.

Figure 7:
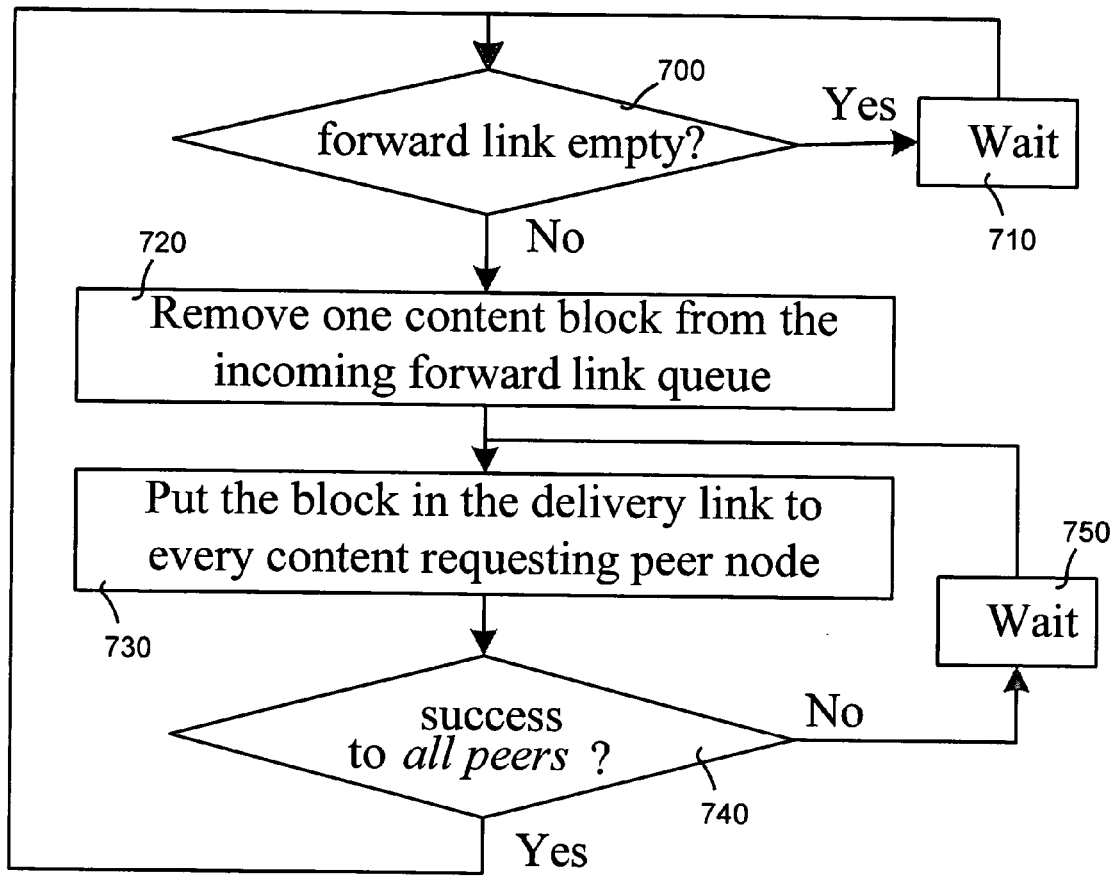
FIG. 7 is a detailed flow diagram illustrating the operation of a forward link thread of a peer node (both content-requesting and non-content-requesting).

FIG. 7 is a detailed flow diagram illustrating the operation of a forward link thread of a peer node (both content-requesting and non-content-requesting). In each iteration loop of the forward link thread, it is determined whether the incoming forward link queue is empty (box 700). If so, then the process waits (box 710). Otherwise, the peer node removes one content block from the incoming forward link queue (box 720). Next, the node copies the content block onto the outgoing delivery link queues to all the other content-requesting peer nodes (box 730). It then is determined whether the content block was successfully put in the queues to all peer nodes (box 740). If not, then the process waits (box 750) and then retries the failing content-requesting node. Otherwise, the iteration begins again.

It should be noted that the forward link thread does not remove another content block from the incoming forward link queue until it has successfully copied the last content block to all the outgoing delivery link queues. That way, if the outgoing delivery links are blocked, possibly resulting from reaching the limit on the upload bandwidth of the peer node, the peer node will stop removing the content blocks from the incoming forward link queue. This effectively regulates the receiving rate of the forward link to be $1/M^{th}$ of the upload bandwidth of the peer node, where M is the number of nodes that the content block is redistributed to, which is $N_1-1$ for content-requesting peer node and $N_1$ for non-content-requesting peer node.

Figure 8:
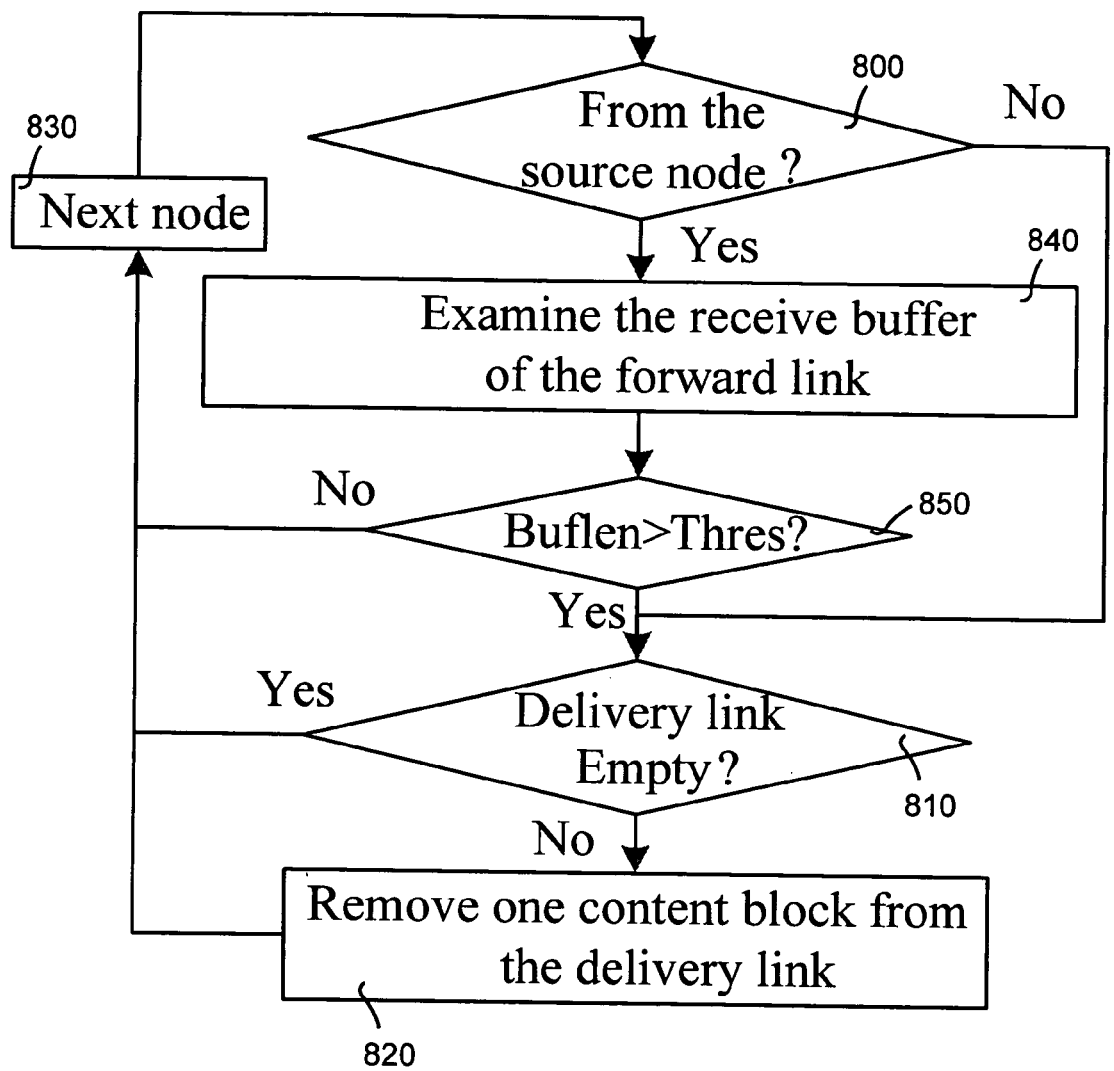
FIG. 8 is a detailed flow diagram illustrating the operation of a delivery link thread of a content-receiving peer node.

FIG. 8 is a detailed flow diagram illustrating the operation of a delivery link thread of a content-receiving peer node. Initially, a determination is made as to whether arriving content blocks are from a source node (box 800). For the content blocks arriving on delivery links from nodes other than the source node, the operation is to remove the content blocks from the incoming delivery link queue as soon as they arrive. First, a determination is made as to whether the incoming delivery link queue is empty (box 810). If not, then the content block is removed from the incoming delivery link queue (box 820). Otherwise, content from the next node is examined (box 830).

For content blocks arriving on the delivery link from the source node, the receive buffer of the forward link is examined (box 840). An additional constraint is that content blocks are removed from the delivery link queue only when the receiving buffer length of the forward link from the same source node is above a certain threshold (box 850). Thus, if the buffer length is not above the threshold, then content block arriving on the delivery link from the source node is not removed. Instead, the delivery link of the next node is examined (box 830). Otherwise, the determination is made as to whether the delivery link is empty (box 810), and, if not, then the content block is removed from the delivery link (box 820).

The rationale is that the delivery link and the forward link are two separate TCP connections sharing the same network path from the source to the peer node. The content blocks sent through the forward link have higher priority, as they are to be redelivered to the other content receiving peers. The receiving buffer length policy guarantees that the bandwidth of the forward link will be at least $1/M^{th}$ of the upload bandwidth before the delivery link from the source node to the peer node is activated.

Figure 9:
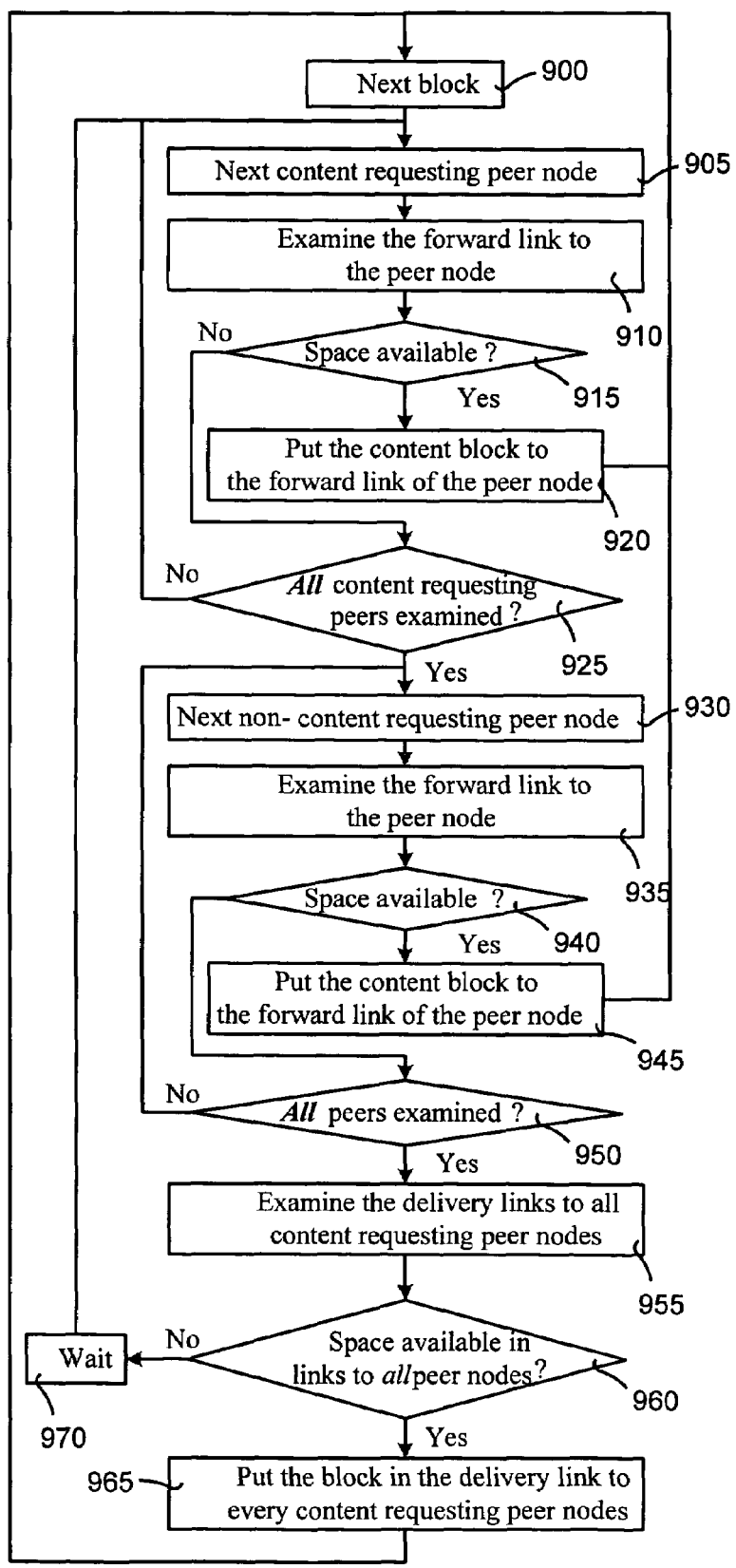
FIG. 9 is a detailed flow diagram illustrating the operation of a source node in accordance with the content distribution method disclosed herein.

FIG. 9 is a detailed flow diagram illustrating the operation of a source node in accordance with the content distribution method disclosed herein. In general, for each content block, the source node selects one of the distribution routes based on the status of the redistribution queue. The route selection is based on the following order of priorities. The redistribution by a content-requesting peer node has the highest priority. The redistribution by a non-content-requesting peer node has the second highest priority. The distribution directly from the source node to all the content-requesting peer nodes has the lowest priority.

In particular, as shown in FIG. 9, the process begins at a next content block (box 900) and a next content-requesting peer node (box 905). The forward link of the peer node then is examined (box 910). The source node checks to determine whether space is available for the content block in any TCP connection of the forward link from the source node to the content-requesting peer node (box 915). If the send buffer of one of the TCP connections is not full and may hold an entire content block, the content block is put into that TCP buffer to be sent to the corresponding content-requesting peer node, which then redistributes the content block to the other content-requesting peer nodes through the corresponding delivery links (box 920). If no space on the forward links to the content-requesting peer nodes can be found, the source node determines whether all content requesting peers have been examined (box 925) and then checks the non-content-requesting peer nodes (box 930) and their forward links (box 935).

If space is found available on a link (box 940), the content block is put into the TCP buffer for the corresponding link (box 945). If all peers have been examined (box 950) and there is still no space available even on the links to the non-content-requesting peer nodes, the source node pursues a final distribution route. This final distribution route examines the delivery links to all the content-requesting peer nodes (box 955) and determines whether there is space for one block in all the content-requesting peer nodes (box 960). Combined with the receiving buffer length policy shown in FIG. 8, this ensures that the bandwidth of the forward link does not get squeezed by the traffic of the forward link. If space is found, the content block is replicated and put into the delivery link to each content-requesting peer node (box 965). If there is no space on any of the distribution routes, the source node will wait for a short amount of time before it will retry to find an available route for the content block again (box 970).

Role of the Redistribution Queue

Using redistribution queues and the above operational strategy for the peer and source nodes, the content distribution method handles anomalies such as packet loss and network congestion during content distribution by adjusting the upload bandwidths of the nodes to achieve the maximum content distribution throughput by fully utilizing the upload bandwidth resources of the source and peer nodes. The optimality of the content distribution method and system will now be explained in further detail.

The content blocks between any two nodes are distributed through a redistribution queue, which in a tested implementation is a TCP connection with a certain size sending and receiving buffer. As pointed out in the "Distribution Route Selection Through Redistribution Queues" section above, the source and peer nodes of the content distribution method and system push as many content blocks as possible into the TCP connections, until the TCP sending buffer is full. The content blocks that are pending in the sending buffers of the TCP connections ensure that the network paths between any two peer nodes are fully utilized, even considering network anomalies such as packet loss and network congestion. If there are no packet losses, new content blocks will be sent to the destination peer nodes through the TCP connections. If there are packet losses or other network anomalies, TCP will try to recover from the network errors through retransmissions, and the content blocks that are pending in the TCP sending buffers will not be sent out. The content blocks that are pending in the TCP receiving buffer of the forward link ensures that the upload bandwidth of the corresponding peer node is fully utilized. After the peer node pushes the last content block into the TCP sending buffer of the delivery links, it can retrieve the content block pending in the TCP receiving buffer. Thus, the activity of pushing blocks into the delivery links can be continued such that upload bandwidth is not wasted.

In addition, as shown in FIGS. 7-9, the content distribution method ensures that the upload bandwidths of the source node and peer nodes are fully utilized. This is achieved by ensuring that the content distribution routes are selected in favor of the distribution through content-requesting peer nodes, then the distribution through non content-requesting peer nodes, and finally the direct distribution from the source node.

If, when using the content distribution method to distribute content to $N_1$ content-requesting peer nodes, the upload bandwidth of the source node is low and the delivery links from the source to the peer nodes are not activated, then the content distribution throughput of the content distribution method will be the upload bandwidth $B_s$ of the source node. In this case, the content is sent out of the source node at rate $B_s$, where the peer nodes have sufficient upload bandwidth to send content to all content-requesting peer nodes. Each content-requesting peer node is receiving content at the rate of $B_s$, as if the source node is only sending the content to it alone. If the upload bandwidth of the source node is high, and the delivery links from the source to the content-requesting peer nodes are activated, then the content distribution throughput of the content distribution method will be the sum of the upload bandwidths of the source and peer nodes, minus a small portion of bandwidth wasted by sending content blocks to the non-content-requesting peers for redelivery, all divided by the number $N_1$ of content-requesting nodes. Consequently, the content distribution method achieves the maximum content distribution throughput calculated in equation (1) no matter what the network resource or capacity (such as the upload bandwidth) configuration of the network. The content distribution method also easily adapts to the changes in network bandwidth through the redistribution queues of the TCP links. If a certain peer node slows down, the content blocks in its delivery links will move slowly, prompting the peer node to retrieve fewer content blocks from its forward link. This in turn causes the source node to send fewer content blocks to this now slowed down peer node, and to redirect the content blocks to other faster peer nodes. Alternatively, if a certain peer node speeds up (for example, if the upload bandwidth increases), the content distribution method can likewise adjust by sending more content blocks to that peer node.

Working Example

In order to more fully understand the content distribution method and system disclosed herein, the operational details of an exemplary working example are presented. It should be noted that this working example is only one way in which the content distribution method and system may be implemented.

In this implementation, the content distribution method and system included a sender module run by the source node and a receiver module run by each of the peer nodes. In order to verify the performance of the content distribution method and system, a content delivery P2P network was constructed having one source node and four content-receiving peer nodes. A media file having a size around 1 MB then was distributed from the source node to all the peer nodes. The actual throughput was measured by dividing the distribution file size by the time it took the content distribution method and system to distribute the file. This then was compared with the theoretical broadcast capacity of the network using the content distribution method versus the actual throughput under a variety of upload bandwidth configurations of the source node and peer nodes. The results are shown in Table 2, while the theoretical broadcast capacity is set forth below.

Using the implementation of the content distribution method and system sender and receiver components shown in FIGS. 7-9, the actual throughput of a network using the content receiving method and system is remarkably close to the analytical broadcast capacity of the peer-to-peer network.

| | | | | | | Throughput (kbps) | |
|---|---|---|---|---|---|---|---|
| | | Upload Bandwidths (kbps) | | | | | Present |
| No. | s | $t_1$ | $t_2$ | $t_3$ | $t_4$ | Analytical | Invention |
| 1 | 500 | 1000 | 1000 | 750 | 500 | 500 | 500.08 |
| 2 | 1000 | 1000 | 1000 | 750 | 500 | 1000 | 999.43 |
| 3 | 500 | 250 | 1000 | 750 | 500 | 500 | 499.95 |
| 4 | 1000 | 750 | 1000 | 750 | 500 | 1000 | 1001.2 |

V. Exemplary Operating Environment

The content distribution method and system are designed to operate in a computing environment and on a computing device. The computing environment in which the content distribution method and system operates will now be discussed. The following discussion is intended to provide a brief, general description of a suitable computing environment in which the content distribution method and system may be implemented.

Figure 10:
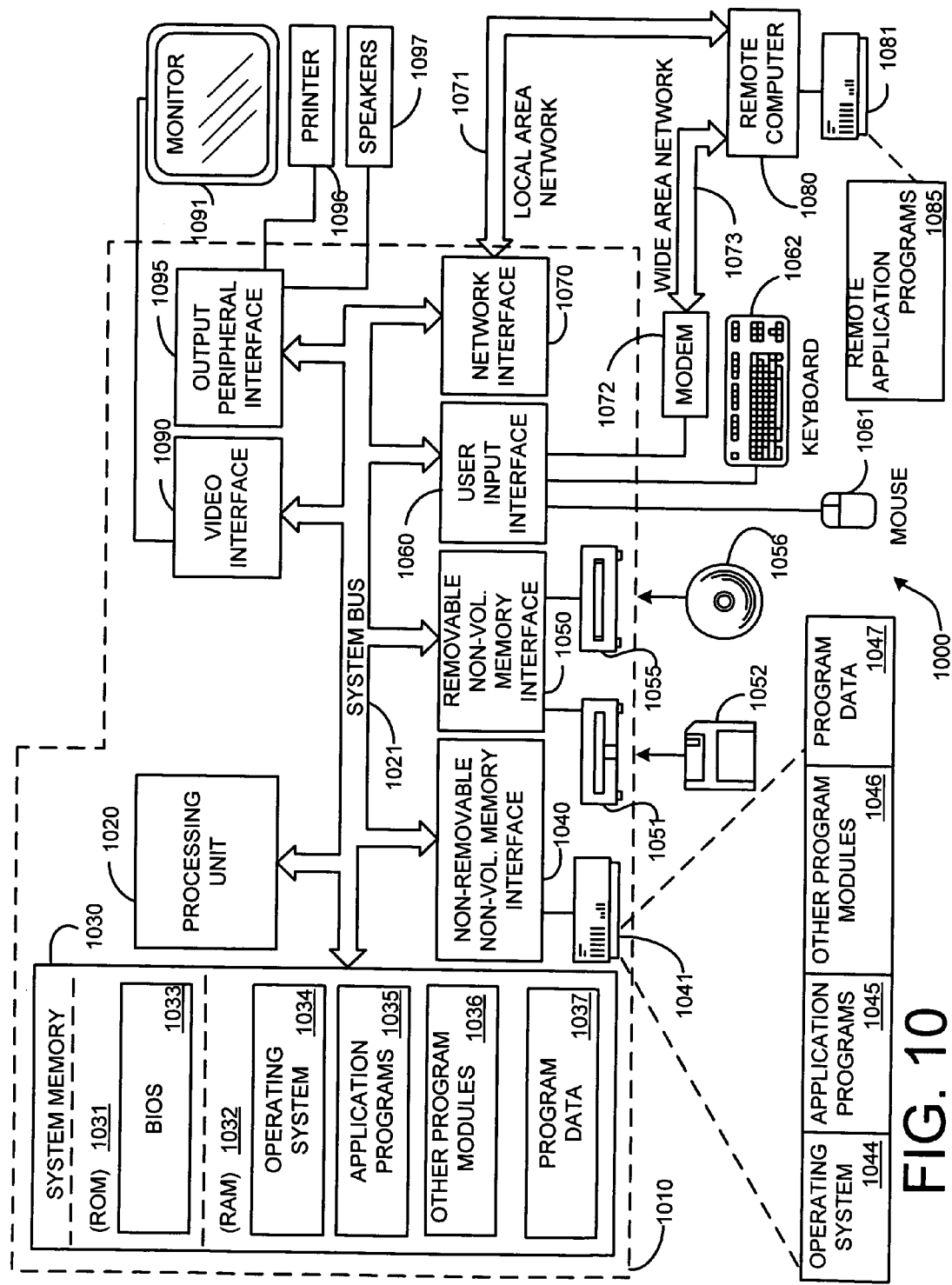
FIG. 10 illustrates an example of a suitable computing system environment in which the content distribution method and system shown in FIG. 5 may be implemented.

FIG. 10 illustrates an example of a suitable computing system environment in which the content distribution method and system shown in FIG. 5 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The content distribution method and system is operational with numerous other general purpose or special purpose computing system environments or configurations. Examples of well known computing systems, environments, and/or configurations that may be suitable for use with the gradient-corrected linear interpolation method and system include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The content distribution method and system may be described in the general context of computer-executable instructions, such as program modules, being executed by a computer. Generally, program modules include routines, programs, objects, components, data structures, etc., that perform particular tasks or implement particular abstract data types. The content distribution method and system may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for implementing the content distribution method and system includes a general-purpose computing device in the form of a computer 1010.

Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

VI. Theoretical Analysis of Maximizing Content Distribution Throughput

In this section we prove that the content distribution method and system is optimal for peer-to-peer networks with constrained upload bandwidths. The content distribution method and system achieves the maximum possible throughput in such networks; it is proven below that no other system can do better.

Let the graph (V,E) represent the network, with V being the set of nodes and E being the set of links (directed edges). Let s in V denote the source node and let T denote the subset in E of content-requesting nodes. Let the remaining nodes be non-content-requesting nodes. Consider two types of capacities. Let c(e) be the capacity of each edge e in E, and let $c_{out}(v)$ represent the upload bandwidth (output capacity) of each node v in V, such that for each node v, the sum of the capacities of the edges leaving v is at most $c_{out}(v)$.

A cut between two nodes $v_1$, $v_2$ in V is a partition of V into two sets $V_1$, $V_2$ such that $v_i$ is in $V_i$, i=1, 2. The value of the cut is the sum of the capacities c(e) on the edges e from $V_1$, to $V_2$.

It is well known that the maximum flow between s and any sink t in T achieves the minimum value over all cuts between s and t. Let $C_t$ be the value of the maximum flow (the max-flow) between s and t. Note that $C_t$=$C_t$(c) depends on the edge capacity function c:E→[0,∞).

Definition: The broadcast capacity between s and T is the minimum maxflow between s and any t in T, that is, C=$\min_t$ $C_t$. Note that like $C_t$, C=C(c) depends on the edge capacity function c.

Figure 11:
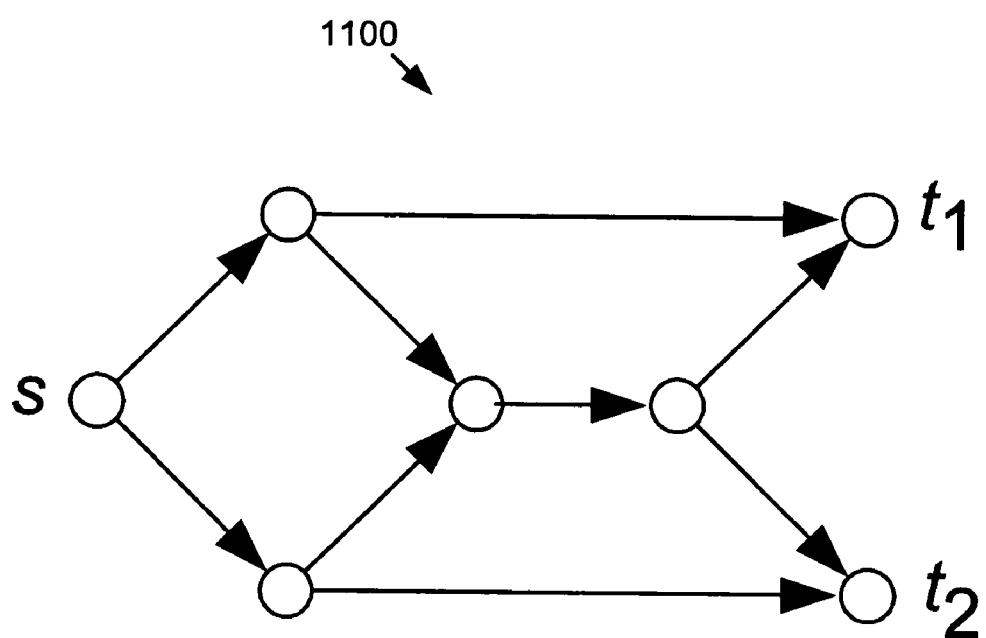
FIG. 11 is a block diagram illustrating that a maximum broadcast capacity is not achievable using multicast routing.

Clearly, the broadcast capacity C is an upper bound on the maximum rate at which common information can be broadcast from s to all nodes in T. Unfortunately, C is not achievable in general using multicast routing. FIG. 11 is a block diagram illustrating that the broadcast capacity C is not achievable using multicast routing 1100. Although C can always be achieved using network coding, this requires the intermediate nodes to code, not merely route, their input packets to produce output packets. If only routing is used, the maximum throughput $C_0$ from s to T via multiple multicast trees can be a factor of log N lower than C. Moreover, determining the optimal collection of multicast trees (achieving $C_0$) is NP-hard, while the tightest known bound on the gap between $C_0$ and the throughput $C_{00} \leq C_0$ achievable in polynomial time is relatively loose. On the other hand, if there are no Steiner nodes in the network (a Steiner node is a node v for which $C_v$<C), then the broadcast capacity C can be simply achieved by greedily packing multiple multicast trees, as implied by Edmonds' theorem.

The content distribution method and system, which is a particularly structured collection of multiple multicast trees, achieves the broadcast capacity C =C(c) for some edge capacity function c(e). Furthermore, it achieves the maximum such broadcast capacity, as the following theorem shows.

Theorem: The content distribution method and system throughput θ achieves the maximum possible broadcast capacity subject to the node output capacity constraints. That is, θ=$\max_c$ C(c) over all edge capacity functions c:E→[0,∞) such that for all nodes v, the sum of c(e) over all edges e leaving v is at most $c_{out}(v)$.

Proof. The following are separate proofs for networks in which $B_s \leq B_{s1} + B_{s2}$ and networks in which $B_s \geq B_{s1} + B_{s2}$. The former is proven with a cut separating s from V-s and we prove the latter with cuts separating V-t from t.

First, assume $B_s \leq B_{s1} + B_{s2}$. For any edge capacity function c, the broadcast capacity C(c) can be at most equal to the value of the cut separating s from V-s. Since this is at most $B_s$=$c_{out}(s)$, this gives $\max_c$ C(c)≤$B_s$. Of course, a throughput θ must satisfy θ≤$\max_c$ C(c). On the other hand, according to equation (1), the content distribution method and system achieves throughput θ=$B_s$. Hence θ=$\max_c$ C(c)=$B_s$.

Now assume $B_s \geq B_{s1} + B_{s2}$. For any edge capacity function c, the sum of c(e) over all edges entering nodes in T must be at least $N_1$ times the broadcast capacity C(c). Thus, denoting U=V-T-s as the set of non-content-receiving nodes, yields the following:

$$N_1 C(c) \leq \sum_{t \in T} \sum_{e \in In(t)} c(e)$$
$$= \sum_{v \in V} \sum_{e \in In(v)} c(e) - \sum_{u \in U} \sum_{e \in In(u)} c(e)$$
$$= \sum_{v \in V} \sum_{e \in Out(v)} c(e) - \sum_{u \in U} \sum_{e \in In(u)} c(e)$$
$$\leq \sum_{v \in V} c_{out}(v) - \sum_{u \in U} \sum_{e \in In(u)} c(e).$$

On the other hand, equation (1) gives (denoting $B_v = c_{out}(v)$):

$$\theta = \frac{1}{N_1 - 1} \sum_{t \in T} B_t + \frac{1}{N_1} \sum_{u \in U} B_u + \frac{1}{N_1}\left(B_s - \frac{1}{N_1 - 1} \sum_{t \in T} B_t - \frac{1}{N_1} \sum_{u \in U} B_u\right).$$

Hence $$N_1 \theta = \frac{N_1}{N_1 - 1} \sum_{t \in T} B_t + \sum_{u \in U} B_u + B_s - \frac{1}{N_1 - 1} \sum_{t \in T} B_t - \frac{1}{N_1} \sum_{u \in U} B_u$$

$$= \sum_{t \in T} B_t + \sum_{u \in U} B_u + B_s - \frac{1}{N_1} \sum_{u \in U} B_u$$

$$= \sum_{v \in V} c_{out}(v) - \sum_{u \in U} \frac{B_u}{N_1}$$

Of course, $\theta \leq \max_c C(c)$, so $N_1 \theta \leq N_1 \max_c C(c) = N_1 C(c^*)$, where $c^*$ is an optimizing capacity function. Thus, $$\sum_{v \in V} c_{out}(v) - \sum_{u \in U} \frac{B_u}{N_1} = N_1 \theta \leq N_1 \max_c C(c)$$

$$= \sum_{v \in V} c_{out}(v) - \sum_{u \in U} \sum_{e \in In(u)} c^*(e).$$

The proof is completed if it can be shown that the inequality holds with equality. Certainly this is true if U is empty. To show this when U is not empty, it is argued that for each u in U, $$\frac{B_u}{N_1} \leq \sum_{e \in In(u)} c^*(e).$$

Otherwise, any flow through u to the $N_1$ content-receiving nodes would be insufficient to use up the upload bandwidth $B_u$. A higher throughput could be achieved by re-allocating some capacity from edges between s and T to edges between s and U.

Corollary: In a file download scenario, the content distribution method and system minimizes the maximum download time experienced by any content-receiving peer node. In a streaming media scenario, the content distribution method and system maximizes the minimum quality experienced by any content-receiving peer node. Therefore, the content distribution method and system is ideal in situations where a distributed group of friends wishes to experience downloaded or streamed content at the same time with the same quality.

Throughput Under Download Bandwidth or Link Bandwidth Constraints

The above discussion assumes that the only bottleneck in the content distribution method and system is the upload bandwidths of the peer nodes. In this section, a brief discussion is presented on the throughput of the content distribution method and system under link bandwidth or download bandwidth constraints.

Consider a peer node i with upload bandwidth $B^U_i$. Let its link bandwidth to the content-receiving peer node j be $B^l_{ij}$, j=0, . . . , M-1, where M is the number of content-receiving nodes other than itself. The link bandwidth between node i and j will not be the bottleneck as long as:

$$B^l_{ij} \geq B^u_i / M$$

If the above inequality is not satisfied, the upload bandwidth of node i cannot be fully utilized in the content distribution method. The effective upload bandwidth of node i becomes:

$$B^{u}_i{}' = M \min_j B^l_{ij}.$$

This effective upload bandwidth can be used in equation (1) to obtain the new throughput of the content distribution method and system.

When a content-receiving peer node has download bandwidth less than the throughput given in equation (1) (which is based only on the upload bandwidths), such a node will also be a bottleneck of the content distribution method and system. In such scenario, the overall throughput will be the minimum download bandwidth of all the content-receiving peer nodes. This is because all nodes have to wait for the slowest node to finish before they can resume delivery.

An alternative strategy to this implementation of the content distribution method and system is to let the slow peer nodes skip certain content blocks, so that they will not slow down the receiving operation of the remaining peer nodes. This allows the peer nodes to still proceed at full speed. In a file download scenario, the slow peer nodes may be able to receive the skipped content after all the remaining nodes have finished downloading. In a streaming media scenario, the slow peer nodes may be able to receive their content with lower quality, if layered media coding is used. In comparison to this alternative approach, the tested implementation of the content distribution method and system maximizes the throughput of common information to all content-receiving peer nodes. It maximizes the minimum quality experienced by any content-recieving peer node in a streaming media scenario, or minimizes the maximum download time experienced by any content-receiving peer node in a file download scenario (for example, if a distributed group of friends wishes to experience downloaded or streamed content at the same time with the same quality). If this is not an objective, but rather if it is permissible to have fast nodes have a higher throughput than slow nodes, then the alternate implementation may be more desirable than the tested implementation.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for distributing content to a plurality of nodes on a computer network, comprising:
   dividing the content into a plurality of blocks;
   assigning each block of the plurality of blocks to a single node of the plurality of nodes for redelivery only by the single assigned node in proportion to a capacity of the node such that a node having a larger capacity is assigned more blocks and a node having a smaller capacity is assigned fewer blocks;
   sending each of the plurality of blocks from a source node to an assigned node of the source node for redelivery, if the assigned node is not the source node;
   redelivering the block by the assigned node to remaining content requesting nodes; and adjusting a content sending rate, θ, in a dynamic manner based on a maximum throughput under prevailing conditions by using the equation:

$$\theta = \begin{cases} B_s & \text{if } \ldots B_s \leq B_{s1} + B_{s2}, \\ (B_{s1} + B_{s2}) + \dfrac{B_s - (B_{s1} + B_{s2})}{N_1} & \text{if } \ldots B_s \geq B_{s1} + B_{s2}, \end{cases}$$

with $$B_{s1} = \frac{N_1}{N_1 - 1} B_1 \text{ and } B_{s2} = \frac{N_2}{N_1} B_2,$$

where $B_S$ is a bandwidth of the source node, $N_1$ is a number of content-requesting peer nodes, $B_1$ is an average bandwidth of the $N_1$ content-requesting peer nodes, $N_2$ is a number of non-content requesting peer nodes, $B_2$ is an average bandwidth of the $N_2$ non-content requesting peer nodes, $B_{s1}$ is an equivalent source node bandwidth when each of the content requesting peer nodes are forwarding data, and $B_{s2}$ is an equivalent source node bandwidth when each of the non-content requesting peer nodes are forwarding data.

2. The method as set forth in claim 1, further comprising defining the capacity of the node in terms of a bandwidth of the node.

3. The method as set forth in claim 2, wherein the bandwidth is the upload bandwidth of the node.

4. The method as set forth in claim 1, wherein a size of each of the plurality of blocks is less than a maximum transmission unit (MTU) of the computer network.

5. The method as set forth in claim 4, wherein the content block size is approximately 1 kilobyte.

6. The method as set forth in claim 1, wherein a size of each of the plurality of blocks is a compromise between a granularity of distribution and an overhead required for identifying the blocks.

7. The method as set forth in claim 1, wherein the assigned node is a content requesting peer node that requests a copy of the content.

8. The method as set forth in claim 1, wherein the assigned node is a non-content requesting peer node that does not requests a copy of the content.

9. The method as set forth in claim 1, wherein the assigned node is a source node.

10. The method as set forth in claim 1, further comprising using a bandwidth control strategy to enable dynamic redistribution of blocks based on changes in the capacity of the node.

11. The method as set forth in claim 10, wherein the bandwidth control strategy further comprises employing redistribution queues between each pair of the nodes in the network.

12. The method as set forth in claim 11, further comprising constructing redistribution queues using a transport control protocol (TCP).

13. The method as set forth in claim 12, wherein the redistribution queues are TOP send and receive buffers.

14. The method as set forth in claim 11, further comprising constructing redistribution queues using application buffers implemented on top of a user datagram protocol (UDP).

15. The method as set forth in claim 1, further comprising defining a forward link as a connection between the source node and the assigned node, where the content blocks sent in the connection are to be further redistributed.

16. The method as set forth in claim 1, further comprising defining a delivery link as a connection between the assigned node and another content requesting peer node, where the content blocks sent in the connection are not to be further redistributed.

17. The method as set forth in claim 1, wherein the computer network is a peer-to-peer network.

18. A computer-readable storage medium having stored and encoded thereon computer-executable instructions for performing the computer-implemented method recited in claim 1.

19. A computer-implemented method for delivering content from a source node to a plurality of content-requesting nodes on a computer network, comprising:
   splitting the content to be delivered into a plurality of smaller content blocks;
   assigning each of the content blocks to a single node for redelivery only by the single assigned node in proportion to a capacity of the single assigned node such that a node having a larger capacity is assigned more blocks and a node having a smaller capacity is assigned fewer blocks;
   sending each of the content blocks from the source node to its assigned not, if the assigned node is not the source node;
   redistributing the content blocks from the assigned node to the remaining content requesting peer nodes; and
   adjusting a content sending rate, θ, in a dynamic manner based on a maximum throughput under prevailing conditions by using the equation:

$$\theta = \begin{cases} B_s & \text{if } \ldots B_s \leq B_{s1} + B_{s2}, \\ (B_{s1} + B_{s2}) + \dfrac{B_s - (B_{s1} + B_{s2})}{N_1} & \text{if } \ldots B_s \geq B_{s1} + B_{s2}, \end{cases}$$

with $$B_{s1} = \frac{N_1}{N_1 - 1} B_1 \text{ and } B_{s2} = \frac{N_2}{N_1} B_2,$$

where $B_S$ is a bandwidth of the source node, $N_1$ is a number of content-requesting peer nodes, $B_1$ is an average bandwidth of the $N_1$ content-requesting peer nodes, $N_2$ is a number of non-content requesting peer nodes, $B_2$ is an average bandwidth of the $N_2$ non-content requesting peer nodes, $B_{s1}$ is an equivalent source node bandwidth when each of the content requesting peer nodes are forwarding data, and $B_{s2}$ is an equivalent source node bandwidth when each of the non-content requesting peer nodes are forwarding data.

20. The computer-implemented method of claim 19, further comprising employing redistribution queues between nodes of the computer network to effectively manage dynamic changes in the computer network.

21. The computer-implemented method of claim 19, wherein the computer network is a peer-to-peer network.

22. The computer-implemented method of claim 21, wherein the assigned node is the content-requesting peer node.

23. The computer-implemented method of claim 21, wherein the assigned node is non-content-requesting peer node that does not request the content.

24. The computer-implemented method of claim 19, further comprising varying a number of content blocks assigned to the node such that the amount of content being redistributed by a node is variable.

25. The computer-implemented method of claim 24, further comprising varying the number of content blocks assigned to the node based on a capacity of the node.

26. The computer-implemented method of claim 25, further comprising defining the capacity of the node in terms of an upload bandwidth of the node.

27. A computer-readable storage medium having stored and encoded thereon computer-executable instructions for performing the computer-implemented method recited in claim 19.

28. A method for distributing content between nodes in a peer-to-peer computer network, comprising:
separating the content into a number of smaller content blocks;
assigning each of the content blocks only to a single node for redelivery only by the single assigned node in proportion to a capacity of the single assigned node such that a node having a larger capacity is assigned more blocks and a node having a smaller capacity is assigned fewer blocks;
employing redistribution queues between the nodes;
reassigning the content blocks using the redistribution queues such that any changes in the upload bandwidth of the assigned node results in a change to the number of blocks assigned to that node for redistribution; and
adjusting a content sending rate, θ, in a dynamic manner based on a maximum throughput under prevailing conditions by using the equation:

$$\theta = \begin{cases} B_s & \text{if } \ldots B_s \leq B_{s1} + B_{s2}, \\ (B_{s1} + B_{s2}) + \dfrac{B_s - (B_{s1} + B_{s2})}{N_1} & \text{if } \ldots B_s \geq B_{s1} + B_{s2}, \end{cases}$$

with $$B_{s1} = \frac{N_1}{N_1 - 1} B_1 \text{ and } B_{s2} = \frac{N_2}{N_1} B_2,$$

where $B_S$ is a bandwidth of the source node, $N_1$ is a number of content-requesting peer nodes, $B_1$ is an average bandwidth of the $N_1$ content-requesting peer nodes, $N_2$ is a number of non-content requesting peer nodes, $B_2$ is an average bandwidth of the $N_2$ non-content requesting peer nodes, $B_{s1}$ is an equivalent source node bandwidth when each of the content requesting peer nodes are forwarding data, and $B_{s2}$ is an equivalent source node bandwidth when each of the non-content requesting peer nodes are forwarding data.

29. The method of claim 28, wherein the redistribution queues are transport control protocol (TCP) send and receive buffers.

30. The method of claim 28, further comprising generating the redistribution queues using application buffers implemented on top of a user datagram protocol (UDP).

31. The method of claim 28, further comprising defining a forward link as a connection between nodes having content blocks to be further redistributed.

32. The method of claim 31, further comprising:
removing one content block from an incoming forward link and defining it as the current content block; and
copying the current content block onto outgoing delivery links of all content-requesting peer nodes.

33. The method of claims 32, further comprising waiting to remove another content block from the incoming forward link until the current content block has been copied to each of the outgoing delivery links.

34. The method of claim 31, further comprising defining a delivery link as a connection between nodes having content blocks not to be further redistributed.

35. The method of claim 34, further comprising:
determining that an arriving content block was sent by one of: (a) a content-requesting node; (b) a non-content-requesting node; and
removing the arriving content block from the delivery link as soon as the block arrives.

36. The method of claim 34, further comprising:
determining that an arriving content block was sent by a source node; and
removing arriving content blocks from the delivery link only when a receiving buffer length of the forward link from the source node is greater than a threshold value.

37. The method of claim 34, further comprising:
determining whether there is space available for a content block in the forward link from the source node to the content-requesting node;
placing the content block into a buffer to be sent to a corresponding content-requesting node; and
redistributing the content block to other content-requesting peer nodes through corresponding delivery links.

38. The method of claim 37, further comprising:
determining that no space is available for a content block in the forward link from the source node to the content-requesting node;
determining whether space is available in forward links to the non-content-requesting peer nodes; and
if space is available, placing the content block into a buffer to be sent to a corresponding non content-requesting node; and
redistributing the content block to other content-requesting peer nodes through corresponding delivery links.

39. The method of claim 38, further comprising:
determining that no space is available for a content block in the forward link from the source node to the content-requesting and non-content-requesting node;
determining whether space is available in all delivery links from the source node to all the content-requesting peer nodes; and
if space is available, placing the content block into buffers of all delivery links from the source node to all the content-requesting peer nodes.

40. The method of claim 39, further comprising:
determining that no space is available for a content block in the forward link from the source node to the content-requesting and non-content-requesting node and no space is available in any of the delivery link from the source node to a content-requesting peer nodes; and
if no space is available, waiting for a short while and then retrying.

* * * * *